(12) United States Patent
Krone et al.

(10) Patent No.: US 6,510,679 B2
(45) Date of Patent: Jan. 28, 2003

(54) HARVESTING MACHINE, ESPECIALLY A SELF-PROPELLED PICK-UP CHOPPER

(75) Inventors: Bernard Krone, Spelle (DE); Thomas Strobel, Stolpen OT Langenwolmsdorf (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 12 days.

(21) Appl. No.: 09/838,599

(22) Filed: Apr. 19, 2001

(65) Prior Publication Data

US 2001/0037638 A1 Nov. 8, 2001

(51) Int. Cl.[7] ............................................. A01D 45/10
(52) U.S. Cl. .......................................... 56/62; 460/134
(58) Field of Search ............................ 460/16, 17, 62, 460/72, 109, 27, 28, 31, 36, 134; 56/61, 62, 63, 121.43–121.46, 14.5, 14.6, 122

(56) References Cited

U.S. PATENT DOCUMENTS 5,463,856 A * 11/1995 Beckwith .................... 460/134
5,657,621 A * 8/1997 Mendes et al. ................ 100/41
6,290,599 B1 * 9/2001 Eis et al. ..................... 460/109

* cited by examiner

*Primary Examiner*—Robert E. Pezzuto
(74) *Attorney, Agent, or Firm*—Jordan & Hamburg LLP

(57) ABSTRACT

A harvesting machine, especially a self-propelled pick-up chopper for picking up and chopping corn, wilted grass, green feed and similar harvested material includes a feeding housing, which is disposed ahead of a chopping device and accommodates feeding rollers, which can be driven. In order to have created a harvesting machine, which can be adapted to different use conditions, provisions are made so that more than two pairs of feeding rollers are provided, which are disposed consecutively in the feed-conveying direction and the upper rollers of which in each case can be driven over a common driving mechanism the common driving mechanism for adjusting the height of the upper rollers, having at least one driving element, which passes through the feeding housing and the position of which can be changed, and this driving element and the upper rollers being disposed so that they can be shifted by sliding in each case in guides at the side of the feeding housing.

37 Claims, 6 Drawing Sheets

HARVESTING MACHINE, ESPECIALLY A SELF-PROPELLED PICK-UP CHOPPER

BACKGROUND OF THE INVENTION

The invention relates to a harvesting machine, especially a self-propelled pick-up chopper for picking up and chopping corn, wilted grass, green feed and similar harvested material with a feeding housing, which is disposed ahead of a chopping device and accommodates feeding rollers, which can be driven.

Harvesting machines of the aforementioned type are known in various developments. Such machines, especially also self-propelled pick-up choppers, have been developed in recent machines to very strong machines which, aside from mowing and harvesting corn, also find use increasingly for chopping wilted material, hay, straw and other harvested materials. For this purpose, a pick-up, a corn dentition or another attachment are disposed ahead of the feeding housing.

Increasingly, there is also a demand for harvesting machines, which can be adapted to use conditions, moreover, with relatively little expenditure or retrofitting. For example, in many cases efforts are also made, for example, to vary also the cut lengths; conventionally, for this purpose, knife arrangements must be changed in known machines. If, for example, feed rollers are driven at a higher speed, the feed segment up to the conveyer roller frequently is inadequate, for example, for detecting foreign objects and stopping the device adequately quickly, to prevent penetration of foreign objects into the chopping device.

SUMMARY OF THE INVENTION

It is therefore an object of the present invention to provide a harvesting machine of the above-mentioned type, which meets the requirements for adaptation to different harvesting conditions.

For accomplishing this objective, the harvesting machine of the initially mentioned type is distinguished owing to the fact that more than two feed roller pairs are provided, which are disposed consecutively in the feeding conveying direction and the upper rollers of which can be driven over a common driving mechanism. For adapting the height of the upper rollers, the common driving mechanism has at least one positionally changeable driving element, which passes through the feeding housing, and the driving element and the upper rollers are disposed in each case so that they be displaced by sliding in guides on the feeding housing side.

With that, a harvesting machine is available, which can be adapted to different use conditions. For example, the upper feed rollers, which can be shifted by sliding and driven by a common driving mechanism, can be adapted to different material streams by changing the driving speed automatically without the need for manual adjustment work, the driving element following the positional accommodation manual adjustment work not being required.

Moreover, due to the common driving mechanism, and the more than two pairs of feeding rollers, disposed consecutively in the feeding conveying direction, the conditions are created for realizing different cut lengths of harvested material, in that a sufficient feeding segment still remains for stopping the feeding device in good time, even at higher speeds, when foreign objects are detected, so that the detected foreign objects do not reach the chopping device. Preferably, a driving mechanism is provided in such a manner for this purpose, that the feed rollers can be driven controllably. The construction expenditure, required for this purpose, is significantly less than that for conventional machines, since everything can be brought about from a common driving coupling.

Because the driving element passes through the feed housing, the external dimensions of the feeding housing are also utilized so that positional changes can be carried out without additional constructional expenditures at other places. The cut length of the harvested material can be changed by controlling the speed of the feed rollers without the need for changing knife arrangements. Preferably, the driving speed can also be controlled as a function of the moisture content of the harvested material with the help of moisture sensors, which act over control electronics on the driving mechanisms of the feed rollers. In addition, when the machine is equipped with a corn cracker, the distance between the nip rollers can also be varied as a function of the moisture content measured in order to optimize a corn cracker for working up the harvested material. Overall, a harvester is best made available which, with little constructional expenditure and without any retrofitting worth mentioning, can be adapted automatically to different use conditions.

Significant further advantages of the invention arise out of the additional dependent claims, the description below and the accompanying drawings.

DESCRIPTION OF THE PREFERRED EMBODIMENTS

Figure 1:
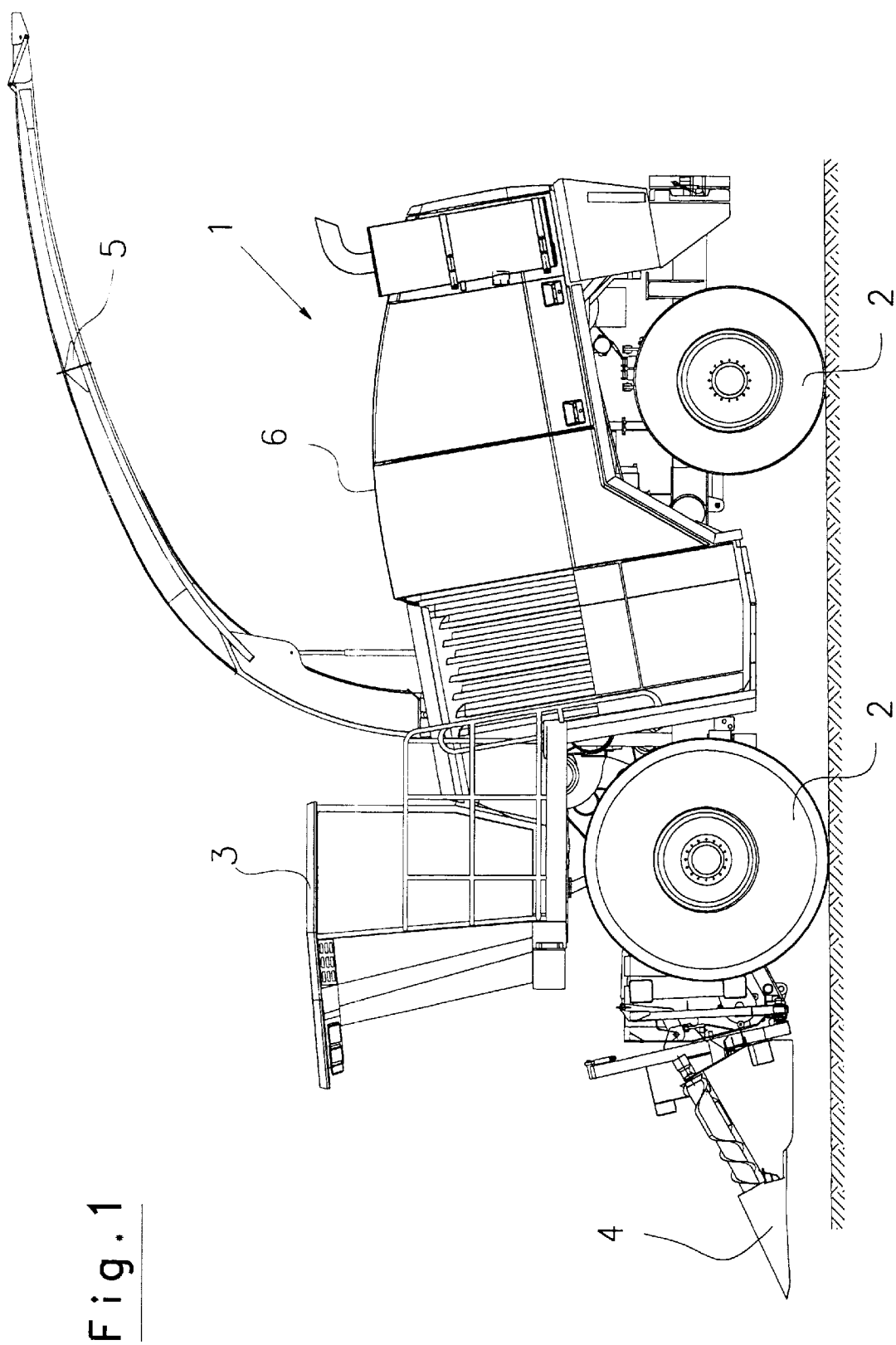
FIG. 1 shows an example of a self-propelled inventive pick-up chopper

The pick-up chopper 1, shown quite generally in FIG. 1, has wheels 2, a cabin 3, a corn dentition 4, which is in front of the pick-up chopper 1 in the example, an ejection pipe 5 and units, disposed within the housing 6, such as the driving mechanism, the transmission, the chopping device, the corn cracker and similar aggregates typical for field choppers.

Figure 2:
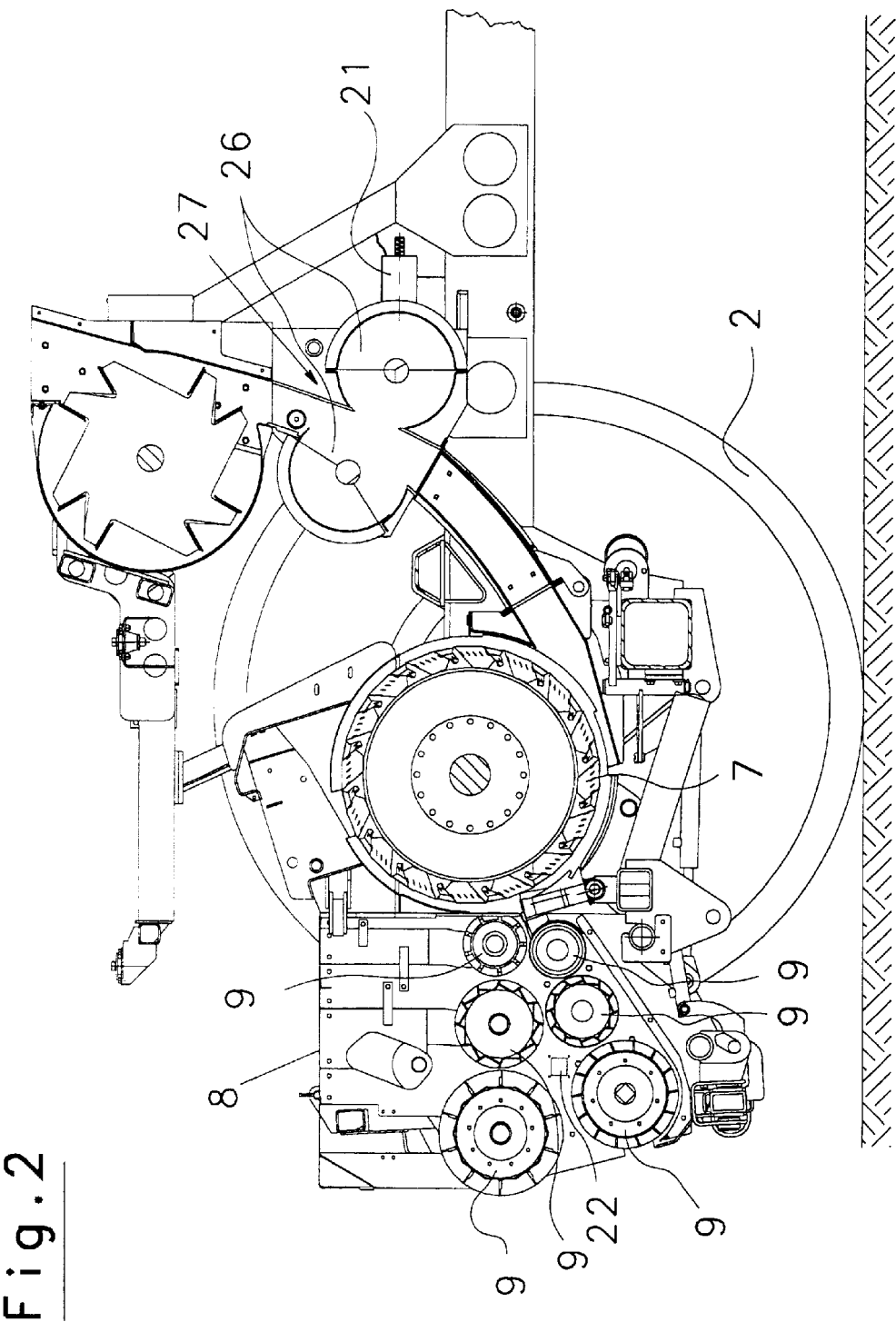
FIG. 2 sectionally shows parts of the example in side view with (partial) representation of the feeding housing with feed rollers, corn cracker and chopping device, as well as a driving mechanism, however, without the parts disposed ahead of the feeding housing.
Figure 3:
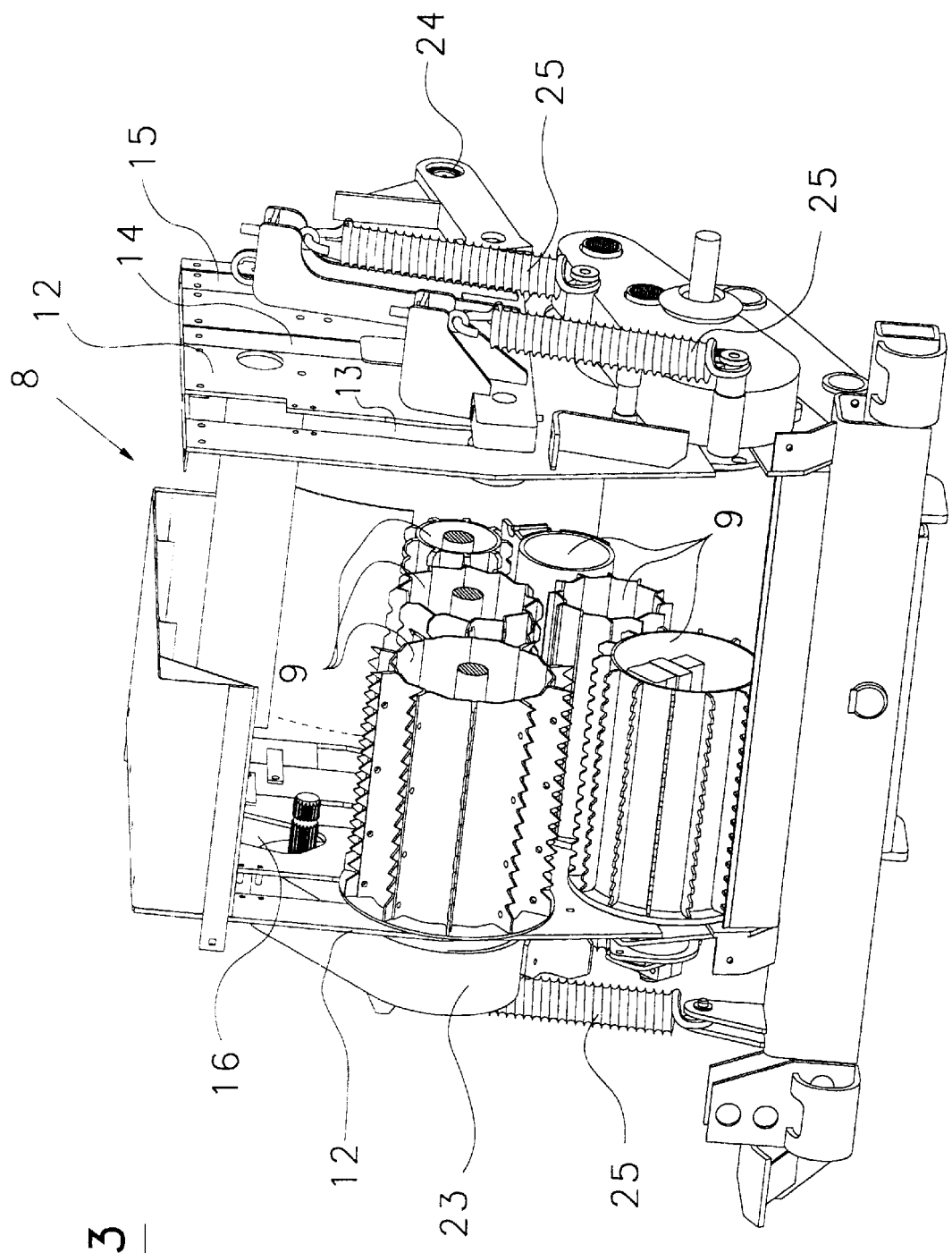
FIG. 3 shows a representation, similar to that of FIG. 2, obliquely from the front right, in sectional, perspective representation.
Figure 4:
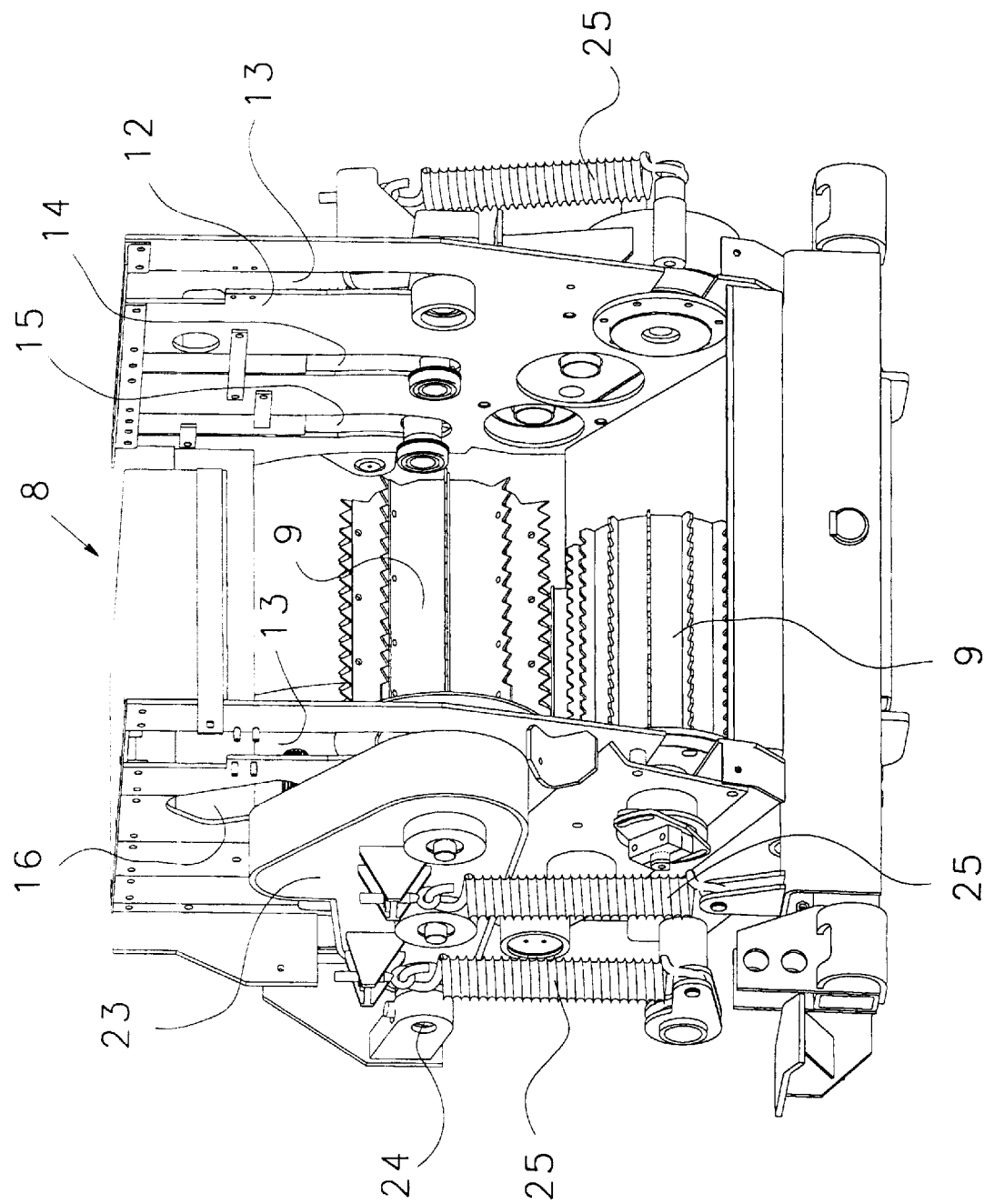
FIG. 4 shows a representation, similar to that of FIG. 3, obliquely from the front (left)
Figure 5:
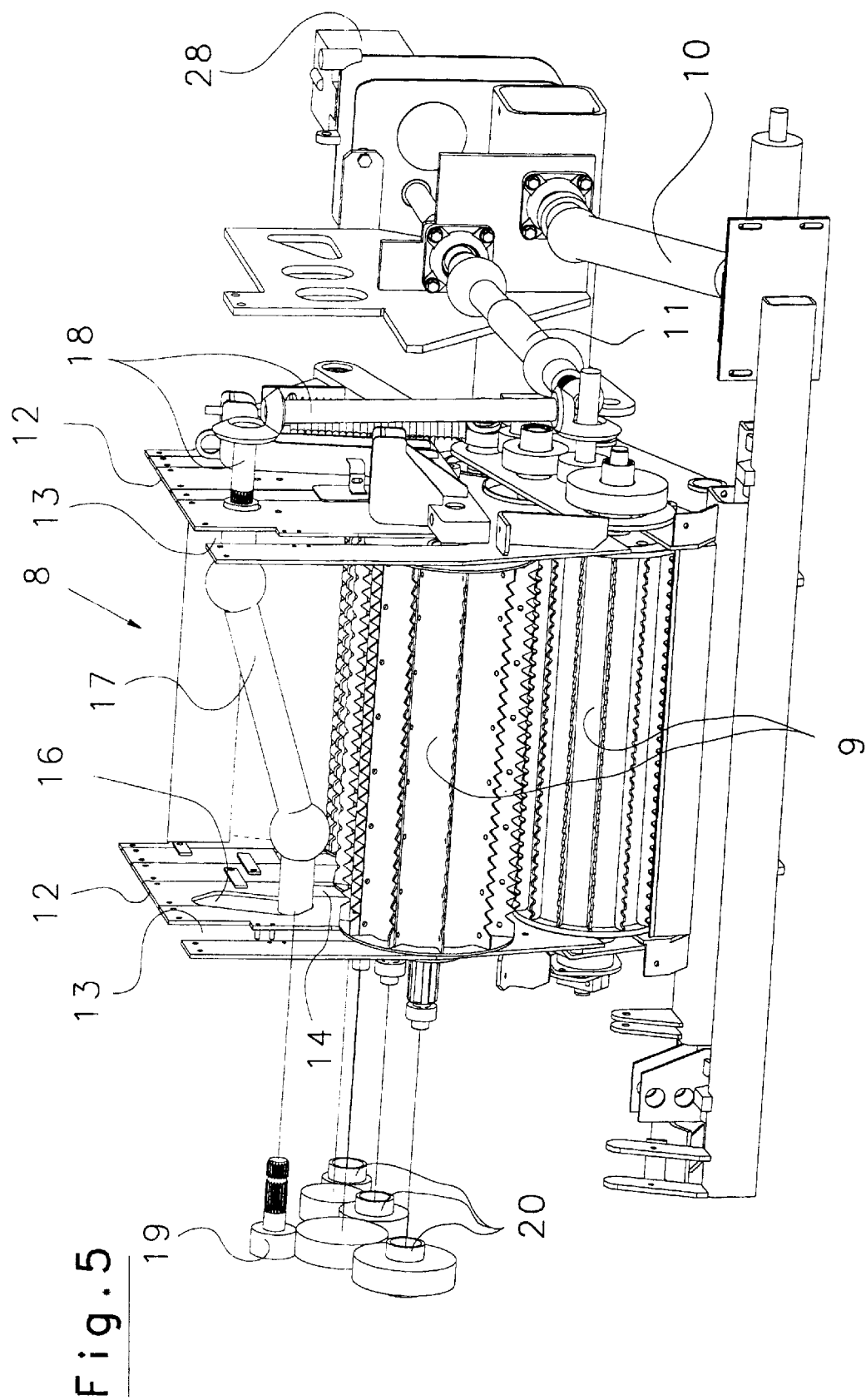
FIG. 5 shows a representation (sectionally), also similar to that of FIG. 3, with a representation of the driving mechanism of the feed rollers.

The feeding housing 8, which is disposed in front of the chopper 7 (FIG. 2), has supplying elements 9 in the form of feed rollers, which are disposed consecutively in the feed conveying direction as well as one above the other, as well as further feed organs, the details of which cannot be seen, such as a pick-up with feeding screws, which can be driven from a universal-joint propeller shaft 10 over transmission units, the details of which are not visible (FIG. 5).

In the example shown, a total of six feed rollers 9 are provided namely three lower feed rollers 9 and three upper feed rollers 9. The lower feed rollers 9, the diameters of which decrease in the feeding direction, are stationary and driven over a universal-joint propeller shaft 11 (FIG. 5). The upper feed rollers 9 are guided positionally changeably in the side walls 12 of the feeding housing 8 in guides 13, 14 and 15, which are aligned parallel to one another. The upper feed rollers 9 are driven over a universal-joint shaft 7, which extends from the—as seen in the feeding conveying direction—right side wall 12 of the housing transversely through the feeding housing 8 up to the—as seen in the feeding conveying direction—left side wall of the feeding housing 8. On the left side of the housing side wall 12, a further guide 16 for the universal-joint shaft 17 is provided, so that the latter, with the upper feed rollers 9, is also positionally variable and can adapt itself therefore to different amounts of material flowing. The feed roller 9 is therefore driven by the—as seen in the feeding conveying direction—right side over the universal-joint propeller shaft 8 and further driving means 18 through the feeding housing 8 onto a gear wheel 19, over which all upper feed rollers are driven by means of further drive-transferring means 20.

Due to this common driving mechanism with the universal-joint shaft 17 passing through the feeding housing 8, the rotational speed can also be controlled very easily, as a result of which different cut lengths of the harvested material can be realized automatically for different uses, without the need for special constructional expenses. For example, the cut lengths can be changed from 17 to 20 mm without any problems by way of the motor 28 (FIG. 5), which can be controlled independently of the driving mechanism for the universal-joint propeller shaft 10. Without that, the rotational speed of the feed rollers 9 can be adapted as a function of the moisture content of the harvested material using moisture sensors 22 and control electronics, the details of which are not shown. If a higher speed is employed, the feed roller pairs present provide adequate distances, so that the segment, available for stopping, is adequate if, for example, foreign objects have been detected. In the sense of an improvement of the silage-making process and a good feed quality, the matching of the chopped length as well as the working-up output of nip rollers 26 of a corn cracker 27 as a function of the moisture content of the material being chopped are of considerable advantage. For this purpose, the moisture content of the harvested material is measured by the moisture sensors 22. By changing the distance between the nip rollers 26 of the corn cracker, the working up of the grain, for example, is adapted over a spindle motor 21 (FIG. 2) and over the control electronics, which are not shown.

Because of the guides 13, 14, 15 and the rocker arms 23, in which they are mounted, the feed rollers 9 are disposed in such a manner, that there is parallel guidance upward. Moreover, they swivel about a rear axis 24. All three upper feed rollers 9 accordingly swivel so that a good take-up of material and delivery to the chopper drum 7 is ensured under all harvesting conditions and throughputs. They swivel about an axis 24 in their position parallel to the chopping device 7, the upper feed rollers 9 adapting in relation to the lower feed rollers 9 to the flow of material. By means of a total of four springs 25, which have been provided in the example, the conditions for the material can be adjusted by the force of the springs, the swiveling being damped.

The moisture content is measured over moisture sensors 22, preferably over the electrical conductivity of the material. For this purpose, two sensors, for example, may be provided at the side walls 12 of the feeding housing 8. They determine the electrical conductivity, information being passed on to a computer.

Figure 6:
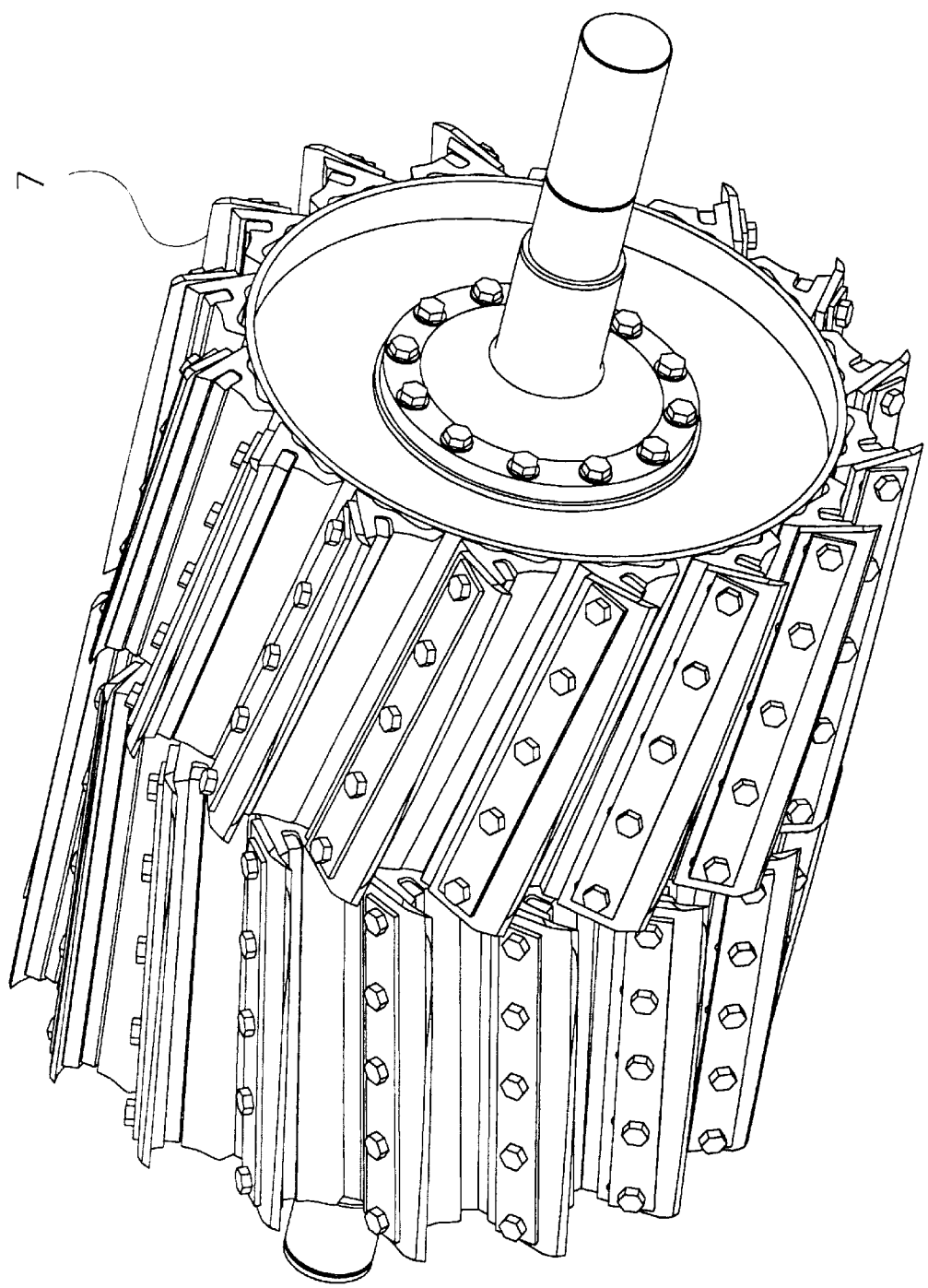
FIG. 6 shows a detailed representation of an example of a chopper drum for an inventive harvester.

Due to the very long supplying path with a total of six feed rollers 9, it is possible to realize high supplying speeds while ensuring a quick stop function. For this purpose, preferably 16 pairs of knives are provided on the chopper drum (FIG. 6) in a V-shaped arrangement of the knives with an overlapping dimension between knives, which are consecutive in the circumferential direction (FIG. 6).

What is claimed is:

1. A harvesting machine, comprising:
   a feeding housing;
   at least three pair of feeding rollers arranged sequentially in said feeding housing, said feeding rollers of each pair including an upper roller and a lower roller arranged below and spaced from said upper roller, said upper rollers having an adjustable position relative to said feeding housing and said lower rollers; and
   common driving means for driving said upper rollers of all of said at least three pair of feeding rollers, said common driving means comprising at least one driving element extending through said feeding housing and having an adjustable position relative to said feeding housing.

2. The harvesting machine of claim 1, wherein said feeding housing includes guides arranged on sides of said feeding housing, said upper rollers and said at least one driving element being movable in said guides.

3. The harvesting machine of claim 2, wherein said guides in which said upper rollers are movable are substantially parallel to one another.

4. The harvesting machine of claim 1, further comprising a chopping device arranged after said feeding housing to receive material passing through said feeding housing.

5. The harvesting machine of claim 1, further comprising rocker arms arranged at sides of said feeding housing, said upper rollers being mounted in said rocker arms.

6. The harvesting machine of claim 5, wherein said rocker arms are adjustable relative to said feeding housing to thereby enable adjustment of the position of said upper rollers relative to said feeding housing and said lower rollers.

7. The harvesting machine of claim 5, wherein said rocker arms are pivotable about a swivel axis relative to said feeding housing.

8. The harvesting machine of claim 1, wherein said at least three pair of feeding rollers consist of only three pair of feeding rollers.

9. The harvesting machine of claim 1, wherein said at least one driving element extends between opposed lateral sides of said feeding housing.

10. The harvesting machine of claim 1, wherein said at least one driving element comprises a driving element having two moving joints situated within said feeding housing.

11. The harvesting machine of claim 10, wherein said moving joints are constructed as universal joints.

12. The harvesting machine of claim 1, wherein said feeding housing comprises a diagonally oriented guide in one side of said feeding housing, said at least one driving element passing through said diagonally oriented guide and being movable therein.

13. The harvesting machine of claim 1, further comprising at least one spring for biasing at least one of said upper rollers toward said lower roller of a respective one of said at least three pair of feeding rollers.

14. The harvesting machine of claim 13, further comprising rocker arms arranged at sides of said feeding housing, said upper rollers being mounted in said rocker arms, said at least one spring being connected to one of said rocker arms.

15. The harvesting machine of claim 1, wherein said at least three pair of feeding rollers are arranged such that a diameter of said feeding rollers of each of said at least three pair of feeding rollers is less than a diameter of any preceding rollers in a direction of conveyance of material through said feeding housing.

16. The harvesting machine of claim 1, wherein said driving means are arranged to drive said upper rollers at a variable speed.

17. The harvesting machine of claim 1, further comprising a metal detector arranged in connection with said feeding housing for detecting metal passing between said upper and lower rollers.

18. The harvesting machine of claim 1, further comprising a moisture sensor arranged in connection with said feeding housing for detecting moisture content of harvested material passing between said upper and lower rollers.

19. The harvesting machine of claim 18, wherein said moisture sensor is arranged to measure electrical conductivity of the harvested material.

20. The harvesting machine of claim 18, wherein said feeding housing comprises at least one housing wall, said moisture sensor being arranged in said at least one housing wall.

21. The harvesting machine of claim 18, wherein said driving means are arranged to consider measurements of said moisture sensor when determining driving speed of said upper rollers.

22. The harvesting machine of claim 18, further comprising a pair of nip rollers arranged after said at least three pair of rollers in a direction of conveyance of material through said feeding housing such that harvested material processed by said at least three pair of feeding rollers is directed toward and into a space between said nip rollers, said nip rollers being spaced from one another in consideration of measurements of said moisture sensor.

23. The harvesting machine of claim 1, wherein said lower rollers are fixed in position relative to said feeding housing.

24. The harvesting machine of claim 1, wherein said common driving means further comprise a motor coupled to said at least one driving element on one side of said feeding housing, a gear wheel coupled to said at least one driving element on an opposite side of said feeding housing, and drive transferring means associated with said gear wheel for transferring rotational drive force to all of said upper rollers.

25. A method for harvesting material, comprising the steps of:
arranging at least three pair of feeding rollers sequentially in a feeding housing of a movable device, the feeding rollers of each pair including an upper roller and a lower roller arranged below and spaced from the upper roller;
enabling adjustment of the position of the upper rollers relative to the feeding housing and the lower rollers;
driving the upper rollers of all of the at least three pair of feeding rollers using a common drive mechanism including at least one driving element extending through the feeding housing; and
enabling adjustment of the position of the at least one driving element relative to the feeding housing.

26. The method of claim 25, wherein the step of enabling adjustment of the position of the upper rollers comprises the steps of arranging elongate guides on sides of the feeding housing and positioning the upper rollers in the guides.

27. The method of claim 25, wherein the step of enabling adjustment of the position of the at least one driving element comprises the steps of arranging a diagonally oriented, elongate guide on one side of the feeding housing and positioning the at least one driving element in the diagonally oriented guide.

28. The method of claim 25, further comprising the steps of:
arranging a rocker arm at each side of the feeding housing; and
mounting ends of the upper rollers in the rocker arms.

29. The method of claim 28, further comprising the step of enabling pivotal movement of the rocker arms relative to the feeding housing to thereby enable adjustment of the position of the upper rollers relative to the feeding housing and the lower rollers.

30. The method of claim 28, further comprising the step of biasing at least one of the upper rollers toward the lower roller of a respective one of the at least three pair of feeding rollers.

31. The method of claim 25, further comprising the step of driving the upper rollers at a variable speed.

32. The method of claim 25, further comprising the steps of:
arranging a chopping device after the at least three pair of feeding rollers in a direction of conveyance of the material through the feeding housing;
providing a mechanism for detecting foreign objects passing between the upper and lower rollers; and
stopping the chopping device upon detection of a foreign objects passing between the upper and lower rollers.

33. The method of claim 25, further comprising the steps of:
detecting moisture content of harvested material passing between the upper and lower rollers; and
adjusting a driving speed of the upper rollers in consideration of the detected moisture content of the harvested material.

34. The method of claim 25, further comprising the steps of:
detecting moisture content of harvested material passing between the upper and lower rollers;
arranging a pair of nip rollers after the at least three pair of rollers in a direction of conveyance of material through the feeding housing such that harvested material processed by the at least three pair of feeding rollers is directed toward and into a space between the nip rollers; and
adjusting a spacing between the nip rollers in consideration of the detected moisture content of the harvested material.

35. The method of claim 25, further comprising the step of fixing the lower rollers in position relative to the feeding housing.

36. The method of claim 25, further comprising the step of adjusting the position of the upper rollers to provide for different cut lengths of harvested material.

37. The method of claim 25, further comprising the step of adjusting the position of the at least one driving element based on the amount of harvested material.

* * * * *

UNITED STATES PATENT AND TRADEMARK OFFICE
CERTIFICATE OF CORRECTION

PATENT NO. : 6,510,679 B2
DATED : January 28, 2003
INVENTOR(S) : Bernard Krone et al.

It is certified that error appears in the above-identified patent and that said Letters Patent is hereby corrected as shown below:

<u>Title pages,</u>
Insert the foreign application priority data information as follows:

-- [30]   Foreign Application Priority Data
May 4, 2000   (DE)......................... 100 21 663.3 --

Signed and Sealed this

Seventeenth Day of June, 2003

JAMES E. ROGAN
*Director of the United States Patent and Trademark Office*